US012665864B2

(12) United States Patent
Lemaitre

(10) Patent No.: US 12,665,864 B2
(45) Date of Patent: Jun. 23, 2026

(54) METHOD FOR MANAGING ACCESS TO A PLURALITY OF BOTS USING AN INDEPENDENT SEARCH CHANNEL, CORRESPONDING COMPUTER PROGRAM PRODUCT, STORAGE MEDIUM, TERMINAL AND SERVERS

(71) Applicant: Orange, Issy-les-Moulineaux (FR)

(72) Inventor: Sébastien Lemaitre, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/038,692

(22) PCT Filed: Nov. 18, 2021

(86) PCT No.: PCT/FR2021/052033
§ 371 (c)(1),
(2) Date: May 24, 2023

(87) PCT Pub. No.: WO2022/112687
PCT Pub. Date: Jun. 2, 2022

(65) Prior Publication Data
US 2024/0297855 A1      Sep. 5, 2024

(30) Foreign Application Priority Data
Nov. 27, 2020    (FR) ...................................... 2012252

(51) Int. Cl.
*H04L 51/02*          (2022.01)
*G06F 16/3329*      (2025.01)
(Continued)

(52) U.S. Cl.
CPC .......... *H04L 51/02* (2013.01); *G06F 16/3329* (2019.01); *H04L 51/04* (2013.01); *H04L 51/52* (2022.05)

(58) Field of Classification Search
CPC ......... H04L 51/02; H04L 51/04; H04L 51/52; G06F 16/3329
See application file for complete search history.

(56) References Cited

U.S. PATENT DOCUMENTS

| | | | |
|---|---|---|---|
| 10,958,600 B1 * | 3/2021 | Annadata ................ | H04L 51/02 |
| 2018/0302349 A1 * | 10/2018 | Ban ......................... | H04L 51/04 |

(Continued)

FOREIGN PATENT DOCUMENTS

| | | |
|---|---|---|
| CN | 110914819 A | 3/2020 |
| WO | WO 2018/190883 A1 | 10/2018 |
| WO | WO 2019/055103 A1 | 3/2019 |

OTHER PUBLICATIONS

International Search Report for International Application No. PCT/FR2021/052033 dated Mar. 30, 2022.

(Continued)

*Primary Examiner* — Soe Hlaing
(74) *Attorney, Agent, or Firm* — Knobbe, Martens, Olson & Bear, LLP

(57)          ABSTRACT

Method for managing access to a plurality of bots, where a search interface, executed on a terminal, performs: transmitting at least one search request to at least one search server, via a search channel independent of one or more communication channels with which one or more messaging clients installed on a target mobile terminal and able to converse with the bots are compatible; receiving, via the search channel and from the at least one search server, a result comprising at least one pair comprising a bot and an associated communication channel; selecting, in the result, a pair; and initiating an opening of a conversation between the target mobile terminal and the bot of the selected pair, by using the channel of the selected pair.

14 Claims, 8 Drawing Sheets

(51) Int. Cl.
H04L 51/04      (2022.01)
H04L 51/52      (2022.01)

(56)      References Cited

U.S. PATENT DOCUMENTS

| | | | |
|---|---|---|---|
| 2018/0332167 A1* | 11/2018 | Lu ....................... | G06F 16/9535 |
| 2019/0089655 A1 | 3/2019 | Uppala et al. | |
| 2023/0188482 A1* | 6/2023 | Willis .................... | H04L 51/56 |
| | | | 709/206 |

OTHER PUBLICATIONS

Office Action for Chinese Patent Application No. 202180079251.1 dated Jul. 17, 2025 from China National Intellectual Property Administration.

* cited by examiner

91

92

101

METHOD FOR MANAGING ACCESS TO A PLURALITY OF BOTS USING AN INDEPENDENT SEARCH CHANNEL, CORRESPONDING COMPUTER PROGRAM PRODUCT, STORAGE MEDIUM, TERMINAL AND SERVERS

CROSS-REFERENCE TO RELATED APPLICATIONS

This application is filed under 35 U.S.C. § 371 as the U.S. National Phase of Application No. PCT/FR2021/052033 entitled "METHOD FOR MANAGING ACCESS TO A PLURALITY OF BOTS WITH USE OF AN INDEPENDENT SEARCH CHANNEL, AND CORRESPONDING COMPUTER PROGRAM PRODUCT, STORAGE MEDIUM, TERMINAL AND SERVERS" and filed Nov. 18, 2021, and which claims priority to FR 2012252 filed Nov. 27, 2020, each of which is incorporated by reference in its entirety.

TECHNICAL FIELD

The field of the development is that of bots. A bot (contraction of "robot") is defined as a computer program (software) operating autonomously and automatically, and capable of processing (that is understanding) information (for example, a dialogue) and triggering actions. The main task of a bot is to perform specific tasks repeatedly.

Chatbots (also referred to as "conversational robots") are a special category of bots. A chatbot is a computer program that simulates conversations (in natural language, for example) with real users. It is used in particular, but not exclusively, to solve problems (for example, for pre-sales and/or post-sales customer support), place orders, etc. Originally, chatbots were based on libraries of questions/answers with predefined scenarios. As progress has been made, thanks to artificial intelligence, some chatbots have become capable of analysing and understanding messages through natural language processing, and learning with machine learning.

More specifically, the development relates to a solution for managing access to a plurality of bots (including chatbots) by a user having at least one mobile terminal.

"Mobile terminal" refers in particular to a smartphone or a tablet.

TECHNOLOGICAL BACKGROUND

Virtually all instant messaging applications (such as Facebook Messenger, WhatsApp, Skype, Slack, etc.) offer the possibility of conversing with chatbots. For example, to converse with a bot on WhatsApp, you simply add it to your contact list, just like any other phone number, and start a conversation with the bot (by clicking a "Start" button).

With the proliferation of bots (especially chatbots), users may have difficulty finding one that is relevant to their needs. There is therefore a need for mobile users to be able to search for a bot matching their need easily and quickly and start a conversation with the relevant bot found. In the same way, for companies that create bots (e.g. to provide a service, a product, a special offer or any information that might reach users), it is important that their bots can be easily searched and identified by mobile terminal users.

In order to address this searchability issue, a "Discover" tab was proposed in the Facebook Messenger instant messaging application. This tab comprises three parts: a part that includes a search bar, a part dedicated to the bots with which the user has recently interacted and a part that classifies bots by category (Education, Entertainment, Finance, Food & Drink, Travel, etc.). Once the user has identified the bot they are looking for, all they have to do is press a "Start" button to converse with that bot on the Facebook Messenger application. In order to appear in the "Discover" tab, bots must comply with a certain number of rules and the Facebook company sorts through using filters and rankings.

A major disadvantage of this known solution is that it is peculiar and limited to the Facebook ecosystem.

Indeed, the user can only search for bots that are available in the Facebook bot shop. In the latter (called "Messenger Bot Store"), any company (e.g. e-commerce, transport, service or information) can create its own bot on Messenger. This bot shop allows Messenger users to chat with bots that are specially designed by brands and companies.

In addition, once the bot search has been completed, the user (with their mobile terminal) can start a conversation with the desired bot (identified through the search) only by using the Facebook Messenger instant messaging application (and therefore the communication channel associated with this application, referred to hereafter as the "Messenger communication channel").

In other words, a bot from the Facebook bot shop is developed for the Messenger communication channel (i.e. the channel associated with the Facebook Messenger application) and cannot be used for any other communication channel ("Whatsapp communication channel", "Skype communication channel", "RCS (Rich Communication Services) communication channel", "SMS (Short Message Service) communication channel", "MMS (Multimedia Messaging Service) communication channel", etc.). A company (e.g. for a brand or a service) must therefore develop another bot for each other communication channel. There is therefore a complexity since it is necessary to implement as many bots as there are communication channels to be reached.

SUMMARY

In a particular embodiment of the development, a method for managing access to a plurality of bots is proposed, in which a bot search interface, executed on a first terminal available to the user, performs the following steps:

transmitting at least one search request to at least one bot search server, via a search channel independent of one or more communication channels with which one or more messaging clients installed on a target mobile terminal and capable of conversing with the bots are compatible, said target mobile terminal belonging to the group comprising the first terminal if it is of the mobile type and at least one second terminal of the mobile type and different from the first terminal;

receiving, via the search channel and from said at least one bot search server, a search result comprising at least one pair comprising a bot and an associated communication channel;

selecting, from the search result, a pair comprising a bot and an associated communication channel; and initiating an opening of a conversation between the target mobile terminal and the bot of the selected pair, using the communication channel of the selected pair.

Thus, the proposed solution is based on a new approach consisting of separating the bot search technology from the chatbot technology (Facebook Messenger, WhatsApp, Skype, RCS, SMS, MMS, etc.). Indeed, the first terminal available to the user performs the bot search using a search channel that is independent of the communication channel used then (by a messaging client installed on the target mobile terminal) to communicate (converse) with the bot selected once the search has been completed.

An advantage of the proposed solution is that the first terminal that runs the search interface with which the bot search is performed is not necessarily the target mobile terminal that enters into conversation with the selected bot. A second mobile terminal is then the target mobile terminal. In this case, the first terminal can be of the mobile or fixed (a computer, for example) type.

Another advantage of the proposed solution is that the bot search is not limited to the bots available in a bot shop associated with a messaging client running on the first terminal. For example, with the proposed solution, even if the messaging client running on the first terminal is Facebook Messenger, the bot search performed by the first terminal may apply to bots that are not included in the Facebook bot shop (called "Messenger Bot Store").

Another advantage of the proposed solution is that it offers greater freedom when selecting a bot once the search has been completed. Indeed, the selection (in the search result comprising one or more bots each associated with a communication channel) does not only consist in selecting a bot but also in selecting a communication channel. In other words, the selection applies to a pair comprising a bot and an associated communication channel. Thus, opening a conversation with the desired bot (identified through the search) does not require the use of a particular channel such as the one associated with a messaging client running on the first terminal.

According to a first particular implementation, the first terminal executes a messaging client that natively integrates said bot search interface.

Thus, in this first implementation, the search technology (interface) is natively integrated into the first messaging client, which improves the fluidity and intuitive use of the search. This also makes it easier to the start the conversation with the selected bot, in the case where the target mobile terminal is the first terminal and the communication channel associated with the selected bot is also associated with the above-mentioned messaging client (i.e. the one that integrates the search interface).

According to a second implementation, the first terminal executes a messaging client that calls a browser executed by the first terminal to initiate said bot search interface.

Thus, in this second implementation, the messaging client does not integrate the search technology (interface) but uses an external browser to initiate it.

According to a particular feature of the first or second implementation, if the target mobile terminal is the first terminal and if the communication channel of the selected pair is different from the communication channel with which said messaging client is compatible, the target mobile terminal uses in the conversation another messaging client that is compatible with the communication channel of the selected pair.

Thus, if the target mobile terminal is the first terminal and if the communication channel of the selected pair is different from the communication channel with which the aforementioned messaging client is compatible, the target mobile terminal switches to another messaging client which is compatible with the communication channel of the selected pair. For example, if the search is initiated from the Facebook Messenger instant messaging application (with a search channel independent of the Messenger communication channel), and if the communication channel of the selected pair is the Skype communication channel, this solution allows switching, on the target mobile terminal, from the Facebook Messenger application (first messaging client) to the Skype application (second messaging client), so that the opening of the conversation (with the selected bot) is performed using the Skype communication channel.

According to a particular characteristic, the at least one search request belongs to the group comprising: a search request by keyword(s), a search request by category(ies) and a request to start a conversation with a specific bot, the so-called search bot, offering a service for searching other bots.

In this way, it is possible to use, separately or in combination, three types of bot searches: by keyword, by category and with a search bot.

According to a particular characteristic, said messaging client, or each messaging client, belongs to the group comprising: an SMS messaging client, an MMS messaging client, an RCS messaging client and an instant messaging client.

Thus, this solution can be implemented regardless of the messaging client type installed on the first terminal.

According to a particular characteristic, selecting a pair comprising a bot and an associated communication channel comprises receiving a choice information via a user interface.

Thus, the user chooses a bot and an associated communication channel and therefore a messaging client to which this communication channel corresponds (for example the Messenger communication channel). The choice of this pair (bot, communication channel) is made, for example, from a list of pairs proposed as a result of the search.

According to one embodiment, the selection of a pair comprising a bot and an associated communication channel comprises an automatic choice made by the first terminal according to at least one choice criterion.

In this embodiment, the choice of a pair (bot, communication channel) is transparent to the user. The automatic choice criterion is aimed at, for example, opening the discussion with the chosen bot according to a preferred conversation channel, making it easier for the user to start a conversation with the chosen bot.

In the case of this embodiment, and according to a particular characteristic, the at least one choice criterion belongs to the group comprising:

choosing a pair comprising a communication channel with which a messaging client being used on the target mobile terminal is compatible; and choosing a pair comprising a communication channel with which a default messaging client on the target mobile terminal is compatible.

Thus, the preferred conversation channel for starting the discussion with the chosen bot is the one associated with a messaging client being used or the one associated with a default messaging client.

According to a particular characteristic, the initiation of the opening of the conversation with the bot of the selected pair is performed using:

the communication channel of the selected pair, between the target mobile terminal and a mediation server; and a substitution channel, between the mediation server and the bot of the selected pair, said mediation server performing an adaptation between the communication channel of the selected pair and the substitution channel.

The use of a mediation server, between the target mobile terminal and the selected bot, allows to offer a greater choice of communication channels, in the pairs proposed in the search result and each associating a bot and a communication channel. In addition, thanks to the channel adaptation performed by the mediation server between the communication channel and the substitution channel, it is not necessary to develop a separate bot for each communication channel. In other words, the same bot developed for the substitution channel can, thanks to the mediation server, be used with different communication channels and therefore with different messaging clients run by the mobile terminals.

In another embodiment of the development, a computer program product that comprises program code instructions for implementing the above-mentioned method, in any of its various embodiments, when said program is executed on a computing machine (computer, processor, etc.) comprised in a terminal, is proposed.

In another embodiment of the development, a non-transitory computer-readable storage medium, storing a computer program comprising a set of instructions executable by a computing machine (computer, processor, etc.) to implement the above-mentioned method in any of its various embodiments, is proposed.

In another embodiment of the development, a first terminal on which at least one messaging client compatible with a communication channel is installed, is proposed. The first terminal comprises a computing machine configured to execute a bot search interface performing the following operations:

transmitting at least one search request to at least one bot search server, via a search channel independent of the communication channel with which the at least one messaging client is compatible;

receiving, via the search channel and from said at least one bot search server, a search result comprising at least one pair comprising a bot and an associated communication channel;

selecting, from the search result, a pair comprising a bot and an associated communication channel; and initiating an opening of a conversation between a target mobile terminal and the bot of the selected pair, using the communication channel of the selected pair, said target mobile terminal belonging to the group comprising the first terminal if it is of the mobile type and at least one second terminal of the mobile type and different from the first terminal.

This first terminal is able to implement in all its embodiments the method for managing access to a plurality of bots just described.

In another embodiment of the development, a bot search server comprising a computing machine configured to perform the following operations is proposed:

receiving at least one search request from a terminal, via a search channel independent of a communication channel with which at least a first messaging client installed on the terminal is compatible; and transmitting, via the search channel and to said terminal, a search result comprising at least one pair comprising a bot and an associated communication channel.

This bot search server is able to implement in all its embodiments the method for managing access to a plurality of bots just described.

In another embodiment of the development, a mediation server is proposed, comprising a computing machine configured to perform, when initiating an opening of a conversation between a target mobile terminal and a bot associated with a communication channel, an adaptation between:

a communication channel, connecting the target mobile terminal and the mediation server, and associated with the bot in a pair of a bot search result; and a substitution channel, connecting the mediation server and the bot.

This mediation server is able to implement in all its embodiments the method for managing access to a plurality of bots just described.

BRIEF DESCRIPTION OF THE DRAWINGS

Other characteristics and advantages of the development will emerge upon reading the following description, provided as a non-restrictive example and referring to the annexed drawings, wherein.

DETAILED DESCRIPTION

In all the figures in this document, identical elements and steps are designated by the same reference number.

Figures 1, 2:
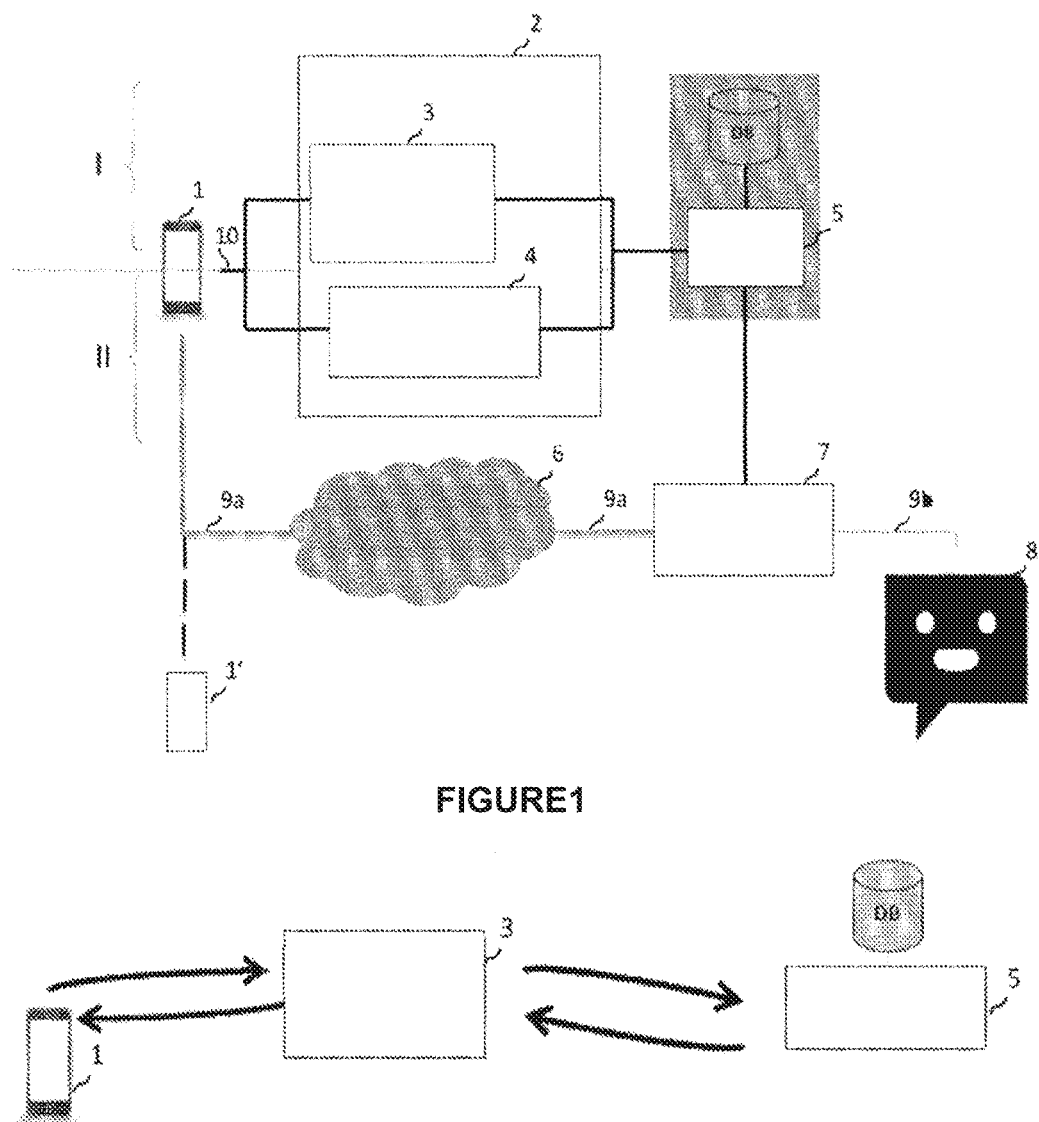
FIG. 1 illustrates a system allowing the implementation of a method for managing access to a plurality of bots, according to an embodiment of the development.
FIG. 2 illustrates a search by keyword(s) in the system of FIG. 1.

A system allowing the implementation of a method for managing access to a plurality of bots, according to an embodiment of the development, is now shown in relation to FIG. 1.

In the example of FIG. 1, the system comprises:

at least one mobile terminal 1 (e.g. a smartphone or a tablet) which, in the particular embodiment considered, plays two roles: it is the terminal (referred to above as the "first terminal") that runs the bot search interface and it is also the target mobile terminal; it hosts one or more messaging clients each compatible with its own communication channel (e.g. the Facebook Messenger application is compatible with the Messenger communication channel, and the Skype application is compatible with the Skype communication channel);

a set 2 of front-end servers providing bot discovery functions when they receive search requests from the mobile terminal 1 as the terminal running the bot search interface, via a search channel 10 independent of the communication channel(s) with which the messaging client(s) installed on the mobile terminal 1 is/are compatible; in the illustrated example, the set 2 of front-end servers comprises at least one text search server 3 and at least one graphic search server 4. These servers 3 and 4 also make it possible to transmit to a mediation server 7, via a back-end server 5, the information of the telephone number of the mobile terminal 1, it is the target mobile terminal, for linking the selected bot to the user of the mobile terminal 1;

at least one back-end server 5 cooperating with a database DB (itself containing data relating to a plurality of bots, with for example for each an identifier, a logo, descriptive information, etc.); the back-end server 5 is queried by the search servers 3 and 4 so that the latter can respond, via the search channel 10, to the search requests transmitted by the mobile terminal 1;

a communication network 6 on which a selected communication channel 9a is established, following a search that allowed to select a bot 8 and this communication channel 9a that is associated with it;

at least one bot 8, the one selected at the end of the above-mentioned search, with which a user of the mobile terminal 1 (since it is the target mobile terminal) can communicate; in the remainder of the description, it is assumed that it is a chatbot (conversational robot), but the development is not limited to this particular type of bot; and at least one mediation server 7, carrying out an adaptation between the selected communication channel 9a, that connects the mobile terminal 1 (since it is the target mobile terminal) and the mediation server 7, and a substitution channel 9b, that connects the mediation server 7 to the chatbot 8. For this purpose, the mediation server 7 communicates with the back-end server 5.

The brace referenced 1 designates the branch of equipment used in the case of a text search and comprising the following elements: the mobile terminal 1, the text search server 3, the back-end server 5 and the database DB.

The brace referenced II designates the branch of equipment used in the case of a graphic search and comprising the following elements: the mobile terminal 1, the graphic search server 4, the back-end server 5 and the database DB.

FIG. 1 also illustrates an embodiment variant in which the terminal 1, that in this case can be of the fixed or mobile type, runs the bot search interface, but does not play the role of the target mobile terminal. It is another mobile terminal, referenced 1' in FIG. 1, that is the target mobile terminal and that therefore communicates with the selected bot 8, via the selected communication channel 9a.

Figure 8:
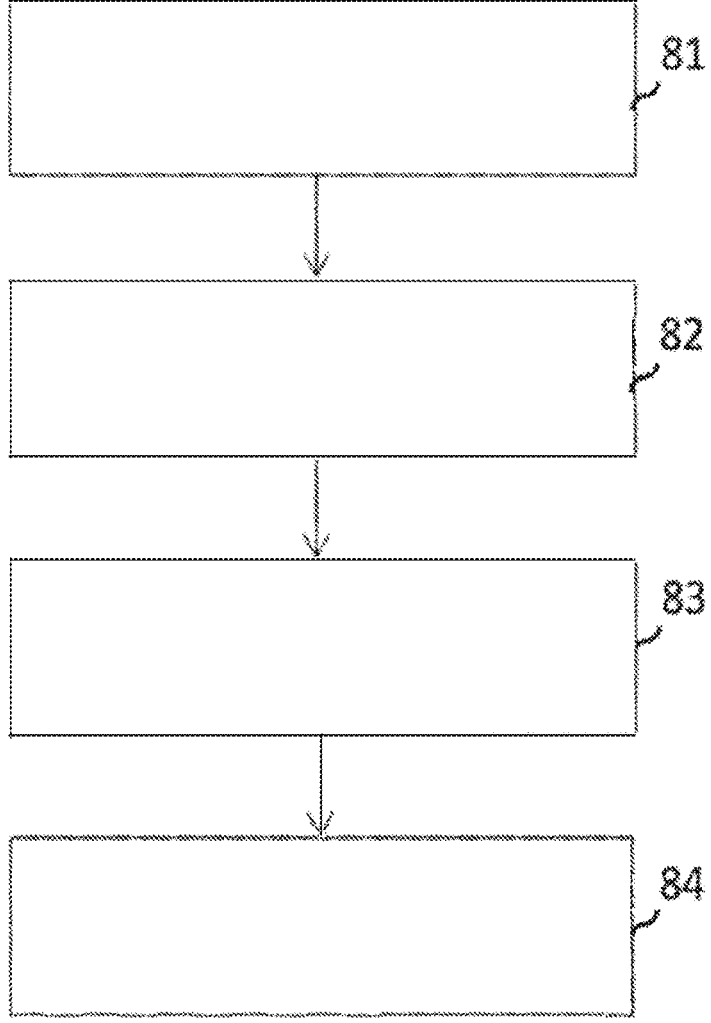
FIG. 8 shows a flowchart of a particular embodiment of the method according to the development, for operations performed by the first terminal.

FIG. 8 shows a flowchart of a particular embodiment of the bot search method according to the development, for operations performed by the first mobile terminal 1. The particular embodiment considered above is used again, in which the mobile terminal 1 plays two roles: it runs the bot search interface and it is the target mobile terminal.

In a step 81, the mobile terminal 1 transmits at least one search request to at least one of the bot search servers 3 and 4, via the search channel 10 that is independent of the communication channel(s) 9a with which the messaging client(s) installed on the mobile terminal 1 is/are compatible. Various types of search request can be considered: search request by keyword(s), search request by category(ies) or request to start a conversation with a search bot (for example, a search chatbot offering a service for searching other chatbots, performed by its own mechanics not described in this document).

"Messaging client" refers in particular but not exclusively to an SMS messaging client, an MMS messaging client, an RCS messaging client or an instant messaging client (Facebook Messenger, WhatsApp, Skype, etc.).

In a step 82, the mobile terminal 1 receives, via the search channel 10 and from the bot search server(s) 3 and 4, a search result comprising at least one pair comprising a bot and an associated communication channel. Examples include a list of pairs, each comprising a chatbot (represented for example by its identifier and/or logo) and an associated communication channel. The same chatbot can be mentioned in different pairs, each time with a separate communication channel. The result can also sometimes include a single pair. The various bots forming the search result can be sorted and presented according to various configurable criteria (sorting and prioritisation based on branding, brand sponsorship, geolocation criteria, etc.).

In a step 83, the mobile terminal 1 selects, from the search result, a pair comprising a bot and an associated communication channel. In the example of FIG. 1, it is assumed that the selected pair comprises the chatbot 8 and the communication channel 9a (it is for example the "Orange Football Club" chatbot with which the Facebook Messenger application, run on the mobile terminal 1, will communicate using the Messenger communication channel). In a particular implementation, the selection made in step 83 (selection of a pair comprising a bot and an associated communication channel) is a function of a choice information received by the mobile terminal 1 via a user interface. In a variant, the selection made in step 83 is a function of an automatic choice made by the mobile terminal 1 according to at least one choice criterion (for example, choice of a pair comprising a communication channel with which a messaging client being used is compatible, or choice of a pair comprising a communication channel with which a default messaging client is compatible).

In a step 84, the mobile terminal 1 initiates the opening of a conversation between the mobile terminal 1, as the target mobile terminal, and the bot 8 of the selected pair, using the communication channel 9a of the selected pair (in the above-mentioned example, the Messenger communication channel with which the Facebook Messenger application is compatible). In the above-mentioned embodiment variant, in which the terminal 1 runs the bot search interface, but the target mobile terminal is another mobile terminal 1', step 84 is slightly different: the mobile terminal 1 initiates the opening of a conversation between the target mobile terminal 1' and the bot 8 of the selected pair, using the communication channel 9a of the selected pair.

In a particular implementation illustrated in FIG. 8, the opening of the conversation with the bot 8 of the selected pair is performed using the mediation server 7, which carries out an adaptation between, on the one hand, the communication channel 9a of the selected pair (first channel located between the target mobile terminal (mobile terminal 1 or mobile terminal 1') and the mediation server 7), and on the other hand, the substitution channel 9b (second channel located between the mediation server 7 and the chatbot 8 of the selected pair). The mediation server 7 initiates the conversation by sending a message, via the selected communication channel 9a, to the target mobile terminal (terminal 1 or terminal 1') of the user. The mediation server 7 previously obtained the telephone number of the target mobile terminal and an identifier of the chatbot 8, thanks to the data exchanged with the search servers 3 and 4 and with the back-end server 5.

In a variant, the initiation of the opening of the conversation is performed without the mediation server 7, that is with a communication channel connecting the target mobile terminal (mobile terminal 1 or mobile terminal 1') and the chatbot 8. The target mobile terminal has previously obtained an identifier for the chatbot 8 enabling it to be contacted directly, thanks to the data exchanged with the search servers 3 and 4 and with the back-end server 5.

One disadvantage of this variant is that the chatbot 8 is developed specifically for one communication channel and is only accessible through it. For accessibility via other communication channels, it is therefore necessary to develop several chatbots having essentially the same functionality but each specific to a particular communication channel.

The embodiment with the mediation server 7 is precisely intended to overcome this disadvantage, by allowing the selected bot 8 to be in conversation with a messaging client run on the target mobile terminal, that is not necessarily compatible with the communication channel 9*b* for which the bot 8 has been developed, the adaptation to this communication channel 9*b* being carried out by the mediation server 7.

In a first embodiment, the mobile terminal 1 runs a messaging client (hereinafter referred to as "first messaging client") that natively integrates a search interface that performs steps 81 to 83.

In a second embodiment, the mobile terminal 1 runs a messaging client (also hereinafter referred to as "first messaging client") that does not natively integrate the above-mentioned search interface, but uses a browser run by the mobile terminal to launch this search interface that performs steps 81 to 83.

If the communication channel of the pair selected in step 83 is different from the communication channel with which the first messaging client is compatible, the mobile terminal 1, as the target mobile terminal, opens the conversation using a second messaging client compatible with the communication channel of the selected pair. For example, if the first messaging client in the above-mentioned sense is the Skype application (compatible with the Skype communication channel) and if the pair selected in step 83 comprises the "Orange Football Club" chatbot 8 and the Messenger communication channel, then the mobile terminal 1 performs, in step 84, the opening of the conversation with the chatbot 8 using the Skype application (which constitutes the second compatible messaging client in the above-mentioned sense).

FIG. 2 illustrates a search by keyword(s) (also referred to as "text search") in the system of FIG. 1. The mobile terminal 1 transmits to the text search server 3 (via the search channel 10, see FIG. 1) a search request comprising at least one keyword provided by the user via a user interface of a messaging client run by the mobile terminal 1. To answer this request, the text search server 3 queries the back-end server 5 (which cooperates with the database DB) and obtains in return answer elements allowing to build a list of bots in relation with the provided keyword. The text search server 3 returns to the mobile terminal 1 an answer comprising this list of bots, specifying for each an associated communication channel. In other words, the answer comprises a list of pairs, each comprising a bot and an associated communication channel.

Figure 3:
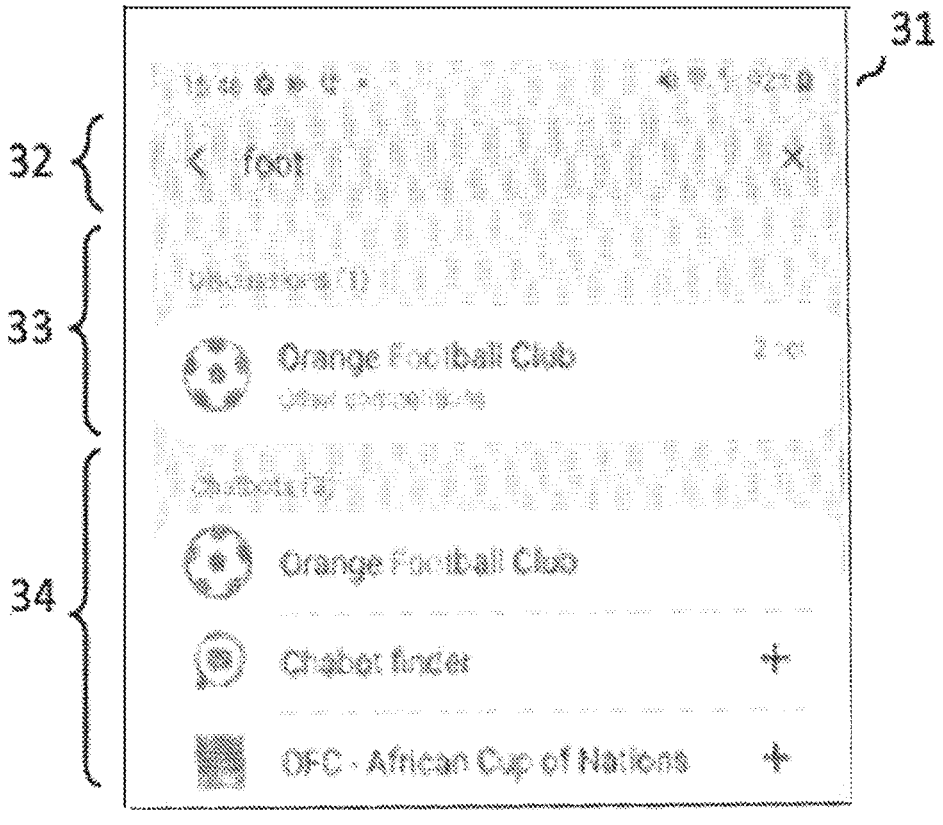
FIG. 3 shows an example of a user interface window displaying the result of a search by keyword(s)

FIG. 3 shows an example of a user interface window 31 displaying the result of a search by keyword(s). It is assumed in this example that the user searched for a bot related to the interest "football". From the messaging client run on their mobile terminal 1, the user has, for example, entered the keyword "football" (see the search zone referenced 32). The search request generated was, for example, in the format described in the GSMA RCC.07 document example: https1// domain/?ho= . . . &client_version= . . . &client_ vendor= . . . &start=0&num=10&i= . . . &q=foot). The request was sent to the text search server 3 that returned it a list of chatbots related to the keyword "foot". This list of chatbots is displayed to the user, within the window 31, in the result area referenced 34. In this example, the communication channel associated with each chatbot in the list is not displayed in the area referenced 34. This is because, for example, only chatbots whose associated communication channel is compatible with the messaging client being used (to perform the search) or with at least one of the other messaging clients installed on the terminal are displayed. Another explanation is that the display of the communication channels associated with the listed chatbots requires an action by the user via the user interface. Such an action consists for example in pressing a "+" button displayed near an identifier and/or a logo of a given chatbot, thus enabling the associated communication channel to be displayed, or even a plurality of associated channels if the chatbot can be accessed via the mediation server 7. In the case where several communication channels are displayed, if the user chooses a channel that is not the one associated with the messaging client being used, then the mobile terminal 1 switches to another messaging client associated with the chosen communication channel, thus allowing the opening of a conversation with the given chatbot. In the illustrated example, the window 31 has another result area, referenced 33, that lists the discussions related to the keyword "foot".

Figure 4:
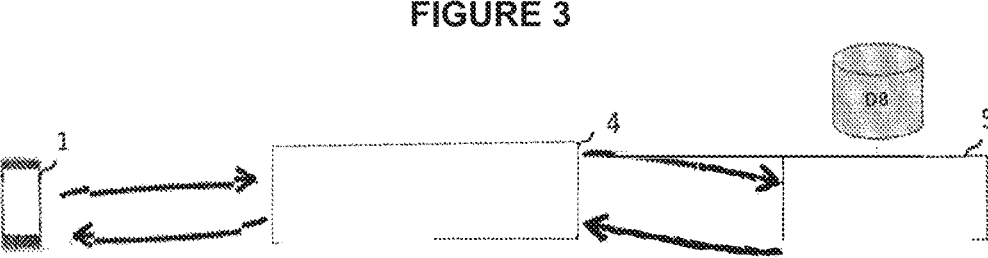
FIG. 4 illustrates a search by category(ies) in the system of FIG. 1.

FIG. 4 illustrates a search by category(ies) (also referred to as "graphic search") in the system of FIG. 1. The mobile terminal 1 transmits to the graphic search server 4 (via the search channel 10, see FIG. 1) a search request comprising at least one category provided by the user via a user interface of a messaging client run by the mobile terminal 1. To answer this request, the graphic search server 4 queries the back-end server 5 (that cooperates with the database DB) and obtains in return answer elements allowing to build a list of bots in relation with the provided category. The graphic search server 4 returns to the mobile terminal 1 an answer comprising this list of bots, specifying for each an associated communication channel.

Figure 5:
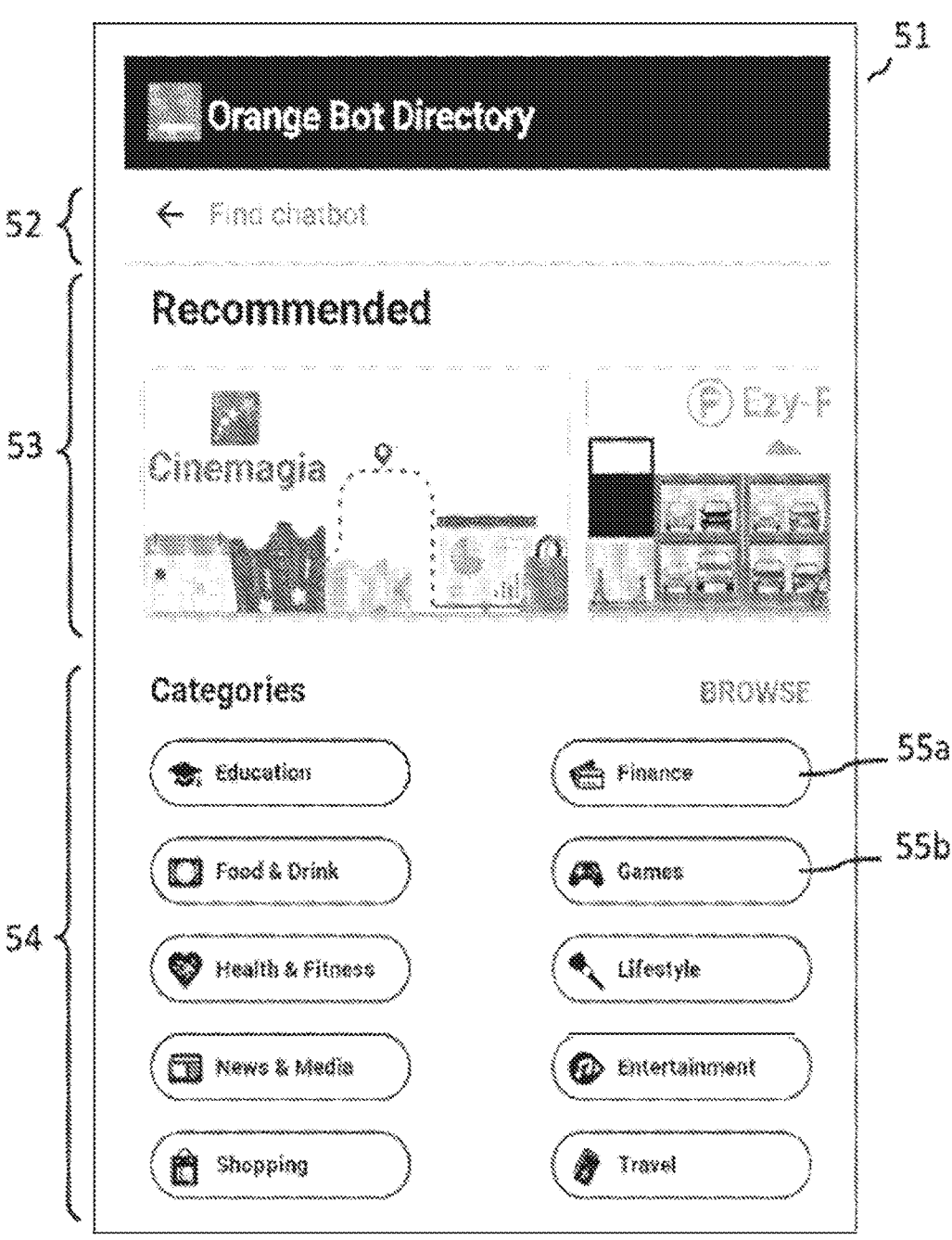
FIG. 5 shows an example of a user interface window inviting a user to choose a category.
Figure 6:
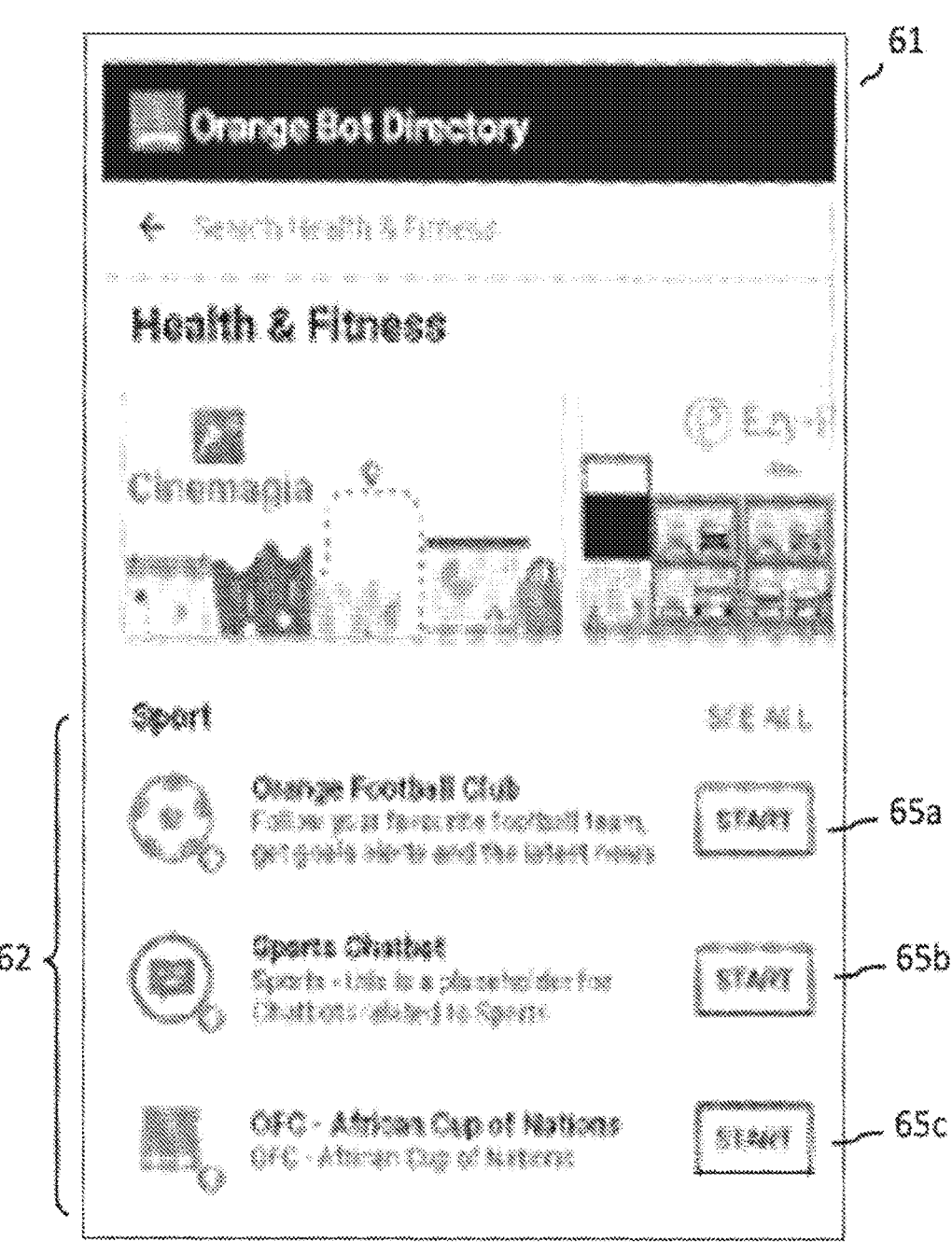
FIG. 6 shows an example of a user interface window displaying the result of a search by category(ies)

An embodiment of a search by category(ies) is now presented in relation to FIGS. 5 and 6. From their messaging client run on their mobile terminal 1, the user opens a web window or a webview solution (first user interface window, not represented) which offers them a first choice of entering the telephone number of the target mobile terminal (terminal 1 or terminal 1') in order to be linked on the target mobile terminal with the bot chosen by the user. The next page (second user interface window, referenced 51 in FIG. 5) provides an example of a category-based organisation for performing the bot search. A recommendation area 53 ("recommended") allows sponsored bots to be reached directly. The user can refine their search by selecting a category among those (5521, 55*b*, etc.) listed in the area referenced 54, or by entering a keyword in the search area referenced 52 and comprising an invitation to enter a keyword ("Find chatbot").

In the illustrative case where the user selected the "Health & Fitness" category, the next page that is displayed (third user interface window referenced 61 in FIG. 6) has a result area referenced 62. In the latter, a list of chatbots is displayed to the user. Each line corresponds to a chatbot and comprises a logo, a name and a brief description of the chatbot, as well as a "Start" button, referenced 65a, 65b, 650 in FIG. 6. In this example, and as in the other example discussed above (see FIG. 3), the communication channel associated with each chatbot in the list is not displayed.

Figure 7:
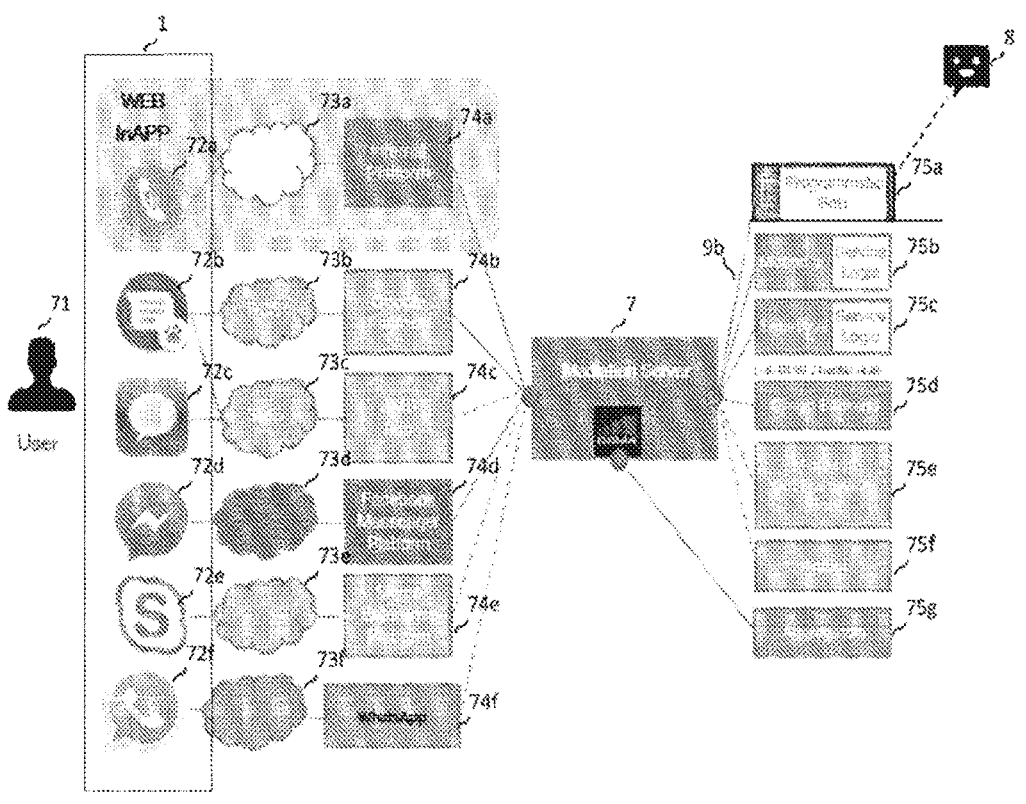
FIG. 7 illustrates the general principle of a mediation server.

FIG. 7 illustrates the general principle of a mediation server 7. The particular embodiment considered above is used again, in which the mobile terminal 1 plays two roles: it runs the bot search interface and it is the target mobile terminal.

It is assumed that the mobile terminal 1 is available to a user 71 on which are installed:

a search interface 72a, implementing steps 81 to 84 of FIG. 8 and using a search channel 73a and an associated platform 74a;

as well as one or more messaging clients (RCS 72b, SMS 72c, Messenger 72d, Skype 72e, WhatsApp 72f, etc.), each using its own communication channel (73b to 73f) and an associated communication platform (74b to 74f).

On a first side, the mediation server 7 is connected to each of the above-mentioned channels (73a to 73f) via the associated communication platform (74a to 74f).

On a second side, the mediation server 7 is connected, via substitution channels 9b, to a plurality of hosting platforms (75a to 75g), each hosting bots. In the illustrated example, the hosting platform 75a hosts in particular the chatbot 8 of FIG. 1 and is connected, via the substitution channel 9b, to the mediation server 7.

The role of the mediation server 7 is to perform a channel adaptation, so that each bot, hosted on one of the hosting platforms (75a to 75g), can communicate, via at least one (and preferably several) of the communication channels (73b to 73f), with at least one (and preferably several) of the messaging clients (72b to 72f) installed on the mobile terminal 1 as the target mobile terminal. It avoids the complexity of having to develop and implement as many bots as there are communication channels (73b to 73f) to be reached.

Figures 9, 10:
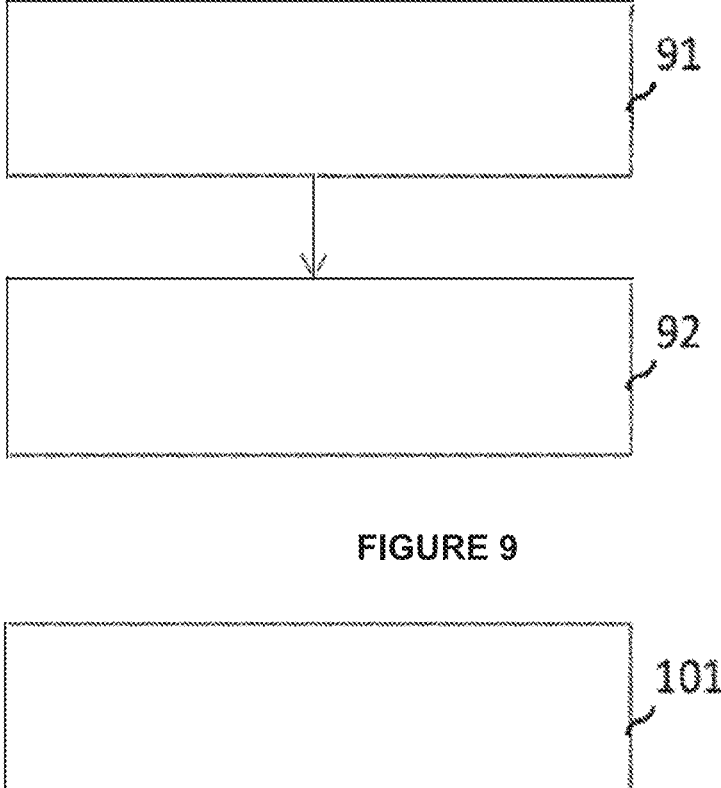
FIG. 9 shows a flowchart of a particular embodiment of the method according to the development, for operations performed by one of the search servers.
FIG. 10 shows a flowchart of a particular embodiment of the method according to the development, for operations performed by the mediation server.

FIG. 9 shows a flowchart of a particular embodiment of the bot search method according to the development, for operations performed by one of the bot search servers 3 and 4, each of which comprises a computing machine configured for this purpose.

In a step 91, the bot search server 3 or 4 receives at least one search request from the mobile terminal 1 as the terminal running the search interface performing the above-mentioned steps 81 to 84, via the search channel 10 that is independent of the communication channel(s) with which the messaging client(s) installed on the mobile terminal 1 as the target mobile terminal is/are compatible.

In a step 92, the search server 3 or 4 transmits, via the search channel 10 and to the mobile terminal 1, a search result comprising at least one pair comprising a bot and an associated communication channel.

FIG. 10 shows a flowchart of a particular embodiment of the bot search method according to the development, for operations performed by the mediation server 7 that comprises a computing machine configured for this purpose, after the selection (step 83) of a pair comprising a bot 8 and an associated communication channel 9a and during the opening of a conversation between the mobile terminal 1, as the target mobile terminal, and the bot 8.

In a step 101, the mediation server 7 performs an adaptation between the communication channel 9a, connecting the mobile terminal 1 and the mediation server 7, and the substitution channel 9b connecting the mediation server 7 and the bot 8. This adaptation includes a conversion between two protocols, for example RCS-MSRP (Rich Communication Services-Message Session Relay Protocol) on the communication channel 9a (access side) and HTTP (Hypertext Transfer Protocol) on the substitution channel 9b (chatbot side).

Figure 11:
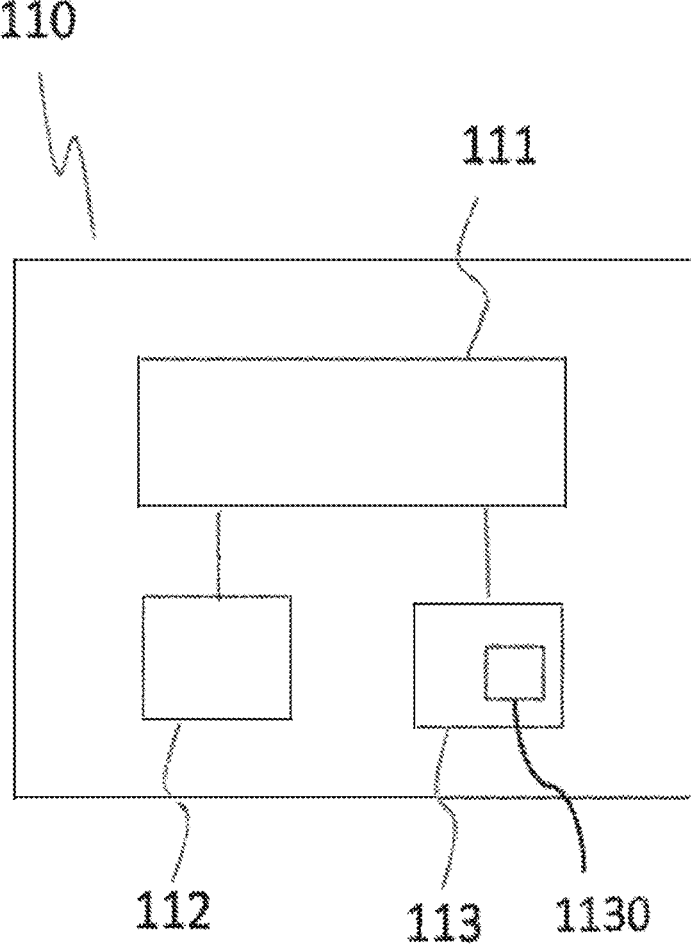
FIG. 11 shows the structure of the first mobile terminal, of the search server and the mediation server according to a particular embodiment of the development.

FIG. 11 shows the structure 110 of the mobile terminal 1 or 1', the search servers 3 and 4, the back-end server 5 and the mediation server 7 according to a particular embodiment of the development.

This structure 110 comprises a random-access memory 112 (a RAM memory, for example), a read-only memory 113 (a ROM memory or a hard disk, for example) and a processing unit 111 (equipped for example with a processor controlled by a computer program 1130 stored in the read-only memory 113). At initialisation, the code instructions of the computer program 1130 are for example loaded into the random-access memory 112 before being executed by the processor of the processing unit 111.

This FIG. 11 only shows a particular one of several possible ways of implementing the above-mentioned devices (1, 1', 3, 4, 5 and 7). Indeed, they may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case of an implementation on a reprogrammable computing machine, the corresponding program (that is the sequence of instructions) can be stored in a removable (such as, for example, a floppy disk, CD-ROM or DVD-ROM) or non-removable storage medium, this storage medium being partially or totally readable by a computer or a processor. As a variant, the storage medium can be a transmissible medium such as an electrical or optical signal, that can be carried via an electrical or optical cable, by radio link, by optical link or by other means.

Alternatively, each storage medium can be an integrated circuit in which the program is embedded, the circuit being adapted to execute or to be used in the execution of the above-mentioned method according to the development.

The programs according to the development can be downloaded in particular on an Internet-type network.

The invention claimed is:

1. A method of managing access to a plurality of bots, wherein a bot search interface, executed on a first terminal available to the user, performs:

transmitting at least one search request to at least one bot search server, the transmission being made via a search channel independent of a plurality of communication channels with which one or more messaging clients are compatible, the one or more messaging clients being installed on a target mobile terminal and capable of conversing with the plurality of bots each using at least one of the communication channels, a same bot of the plurality of bots being able to be used with different communication channels among the plurality of communications channels, the target mobile terminal belonging to a group comprising the first terminal if it is of the mobile type and at least one second terminal of the mobile type and different from the first terminal;

receiving, via the search channel and from the at least one bot search server, a search result comprising at least two pairs comprising a same bot and two separate associated communication channels;

selecting, from the search result, a pair comprising both a bot and an associated communication channel; and initiating an opening of a conversation between the target mobile terminal and the bot of the selected pair, using the communication channel of the selected pair.

2. The method according to claim 1, wherein the first terminal executes a messaging client that natively integrates the bot search interface.

3. The method according to claim 1, wherein the first terminal executes a messaging client that calls a browser executed by the first terminal to initiate the bot search interface.

4. The method according to claim 2, wherein, if the target mobile terminal is the first terminal and if the communication channel of the selected pair is different from the communication channel with which the messaging client is compatible, the target mobile terminal uses in the conversation another messaging client that is compatible with the communication channel of the selected pair.

5. The method according to claim 1, wherein the at least one search query belongs to a group comprising:

a search query by keyword(s);

a search query by category(ies); and a request to start a conversation with a specific bot, known as a search bot, offering a search service for other bots.

6. The method according to claim 1, wherein the messaging client, or each messaging client, belongs to a group comprising:

an SMS messaging client;

an MMS messaging client;

an RCS messaging client; and an instant messaging client.

7. The method according to claim 1, wherein selecting a pair comprising a bot and an associated communication channel comprises receiving a choice information via a user interface.

8. The method according to claim 1, wherein the selection of a pair comprising a bot and an associated communication channel comprises an automatic choice made by the first terminal according to at least one choice criterion.

9. The method according to claim 8, wherein the at least one choice criterion belongs to a group comprising:

choosing a pair comprising a communication channel with which a messaging client being used on the target mobile terminal is compatible; and choosing a pair comprising a communication channel with which a default messaging client on the target mobile terminal is compatible.

10. The method according to claim 1, wherein the initiation of the opening of the conversation with the bot of the selected pair is performed using:

the communication channel of the selected pair, between the target mobile terminal and a mediation server; and a substitution channel, between the mediation server and the bot of the selected pair, the mediation server performing an adaptation between the communication channel of the selected pair and the substitution channel.

11. A processing circuit comprising a processor and a memory, the memory storing program code instructions of a computer program that, when the computer program is executed by the processor comprised in a terminal, implements the method according to claim 1.

12. A computer-readable and non-transient storage medium, storing the computer program according to claim 11.

13. A first terminal on which at least one messaging client compatible with a communication channel is installed, wherein the first terminal comprises a computing machine configured to execute a bot search interface performing the following operations:

transmitting at least one search request to at least one bot search server, the transmission being made via a search channel independent of the communication channel with which the at least one messaging client is compatible, the at least one messaging client using the communication channel;

receiving, via the search channel and from the at least one bot search server, a search result comprising at least two pairs comprising a same bot and two separate associated communication channels;

selecting, from the search result, a pair comprising both a bot and an associated communication channel; and initiating an opening of a conversation between a target mobile terminal and the bot of the selected pair, using the communication channel of the selected pair, the target mobile terminal belonging to a group comprising the first terminal if it is of the mobile type and at least one second terminal of the mobile type and different from the first terminal.

14. A bot search server, wherein the bot search server comprises a computing machine configured to perform the following operations:

receiving at least one search request from a terminal, via a search channel independent of a communication channel with which at least a first messaging client installed on the terminal is compatible; and transmitting, via the search channel and to the terminal, a search result comprising at least two pairs comprising a same bot and two separate associated communication channels.

*      *      *      *      *